US 11,727,548 B2

(12) United States Patent
Le Pendu et al.

(10) Patent No.: US 11,727,548 B2
(45) Date of Patent: Aug. 15, 2023

(54) METHOD AND APPARATUS FOR ENCODING AND DECODING HDR IMAGES

(71) Applicant: InterDigital VC Holdings, Inc., Wilmington, DE (US)

(72) Inventors: Mikael Le Pendu, Rennes (FR); Ronan Boitard, Belz (FR); Christine Guillemot, Rennes (FR); Dominique Thoreau, Cesson-Sévigné (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 619 days.

(21) Appl. No.: 16/784,124

(22) Filed: Feb. 6, 2020

(65) Prior Publication Data

US 2020/0172813 A1 Jun. 4, 2020
US 2021/0062095 A9 Mar. 4, 2021

Related U.S. Application Data

(63) Continuation of application No. 15/122,149, filed as application No. PCT/EP2015/053747 on Feb. 23, 2015, now Pat. No. 10,650,501.

(30) Foreign Application Priority Data

Feb. 26, 2014 (EP) .................................... 14305266
Apr. 1, 2014 (EP) .................................... 14305480

(51) Int. Cl.
*C10G 5/00* (2006.01)
*C10G 45/58* (2006.01)
(Continued)

(52) U.S. Cl.
CPC ................ *G06T 5/009* (2013.01); *G06T 5/40* (2013.01); *H04N 19/117* (2014.11);
(Continued)

(58) Field of Classification Search
CPC . C10G 2/31; C10G 2/32; C10G 45/58; C10G 47/00; C10G 49/00; C10G 5/00;
(Continued)

(56) References Cited

U.S. PATENT DOCUMENTS 7,020,822 B2   3/2006   Ho et al.
7,436,854 B2  10/2008   Miyake et al.
(Continued)

FOREIGN PATENT DOCUMENTS

CN   102341825 A   2/2012
CN   102388612 A   3/2012
(Continued)

OTHER PUBLICATIONS

Z. Mai, H. Mansour, R. Mantiuk, P. Nasiopoulos, R. Ward and W. Heidrich, "Optimizing a Tone Curve for Backward-Compatible High Dynamic Range Image and Video Compression," in IEEE Transactions on Image Processing, vol. 20, No. 6, pp. 1558-1571, Jun. 2011, doi: 10.1109/TIP.2010.2095866. (Year: 2011).*
(Continued)

*Primary Examiner* — Michael J Vanchy, Jr.

(57) ABSTRACT

To encode High Dynamic Range (HDR) images, the HDR images can be converted to Low Dynamic Range (LDR) images through tone mapping operation, and the LDR images can be encoded with an LDR encoder. The present principles formulates a rate distortion minimization problem when designing the tone mapping curve. In particular, the tone mapping curve is formulated as a function of the probability distribution function of the HDR images to be encoded and a Lagrangian multiplier that depends on encoding parameters. At the decoder, based on the parameters indicative of the tone mapping function, an inverse tone mapping function can be derived to reconstruct HDR images from decoded LDR images.

51 Claims, 11 Drawing Sheets

(51) Int. Cl.
*C10G 2/00* (2006.01)
*C10G 47/00* (2006.01)
*C10G 49/00* (2006.01)
*C10G 67/00* (2006.01)
*G06T 5/00* (2006.01)
*G06T 5/40* (2006.01)
*H04N 19/147* (2014.01)
*H04N 19/186* (2014.01)
*H04N 19/30* (2014.01)
*H04N 19/117* (2014.01)
*H04N 19/126* (2014.01)
*H04N 19/184* (2014.01)
*H04N 19/44* (2014.01)
*H04N 19/91* (2014.01)

(52) U.S. Cl.
CPC ......... *H04N 19/126* (2014.11); *H04N 19/147* (2014.11); *H04N 19/184* (2014.11); *H04N 19/186* (2014.11); *H04N 19/30* (2014.11); *H04N 19/44* (2014.11); *H04N 19/91* (2014.11); *G06T 2207/10024* (2013.01); *G06T 2207/20208* (2013.01)

(58) Field of Classification Search
CPC .......... C10G 67/00; G06T 2207/10024; G06T 2207/20208; G06T 5/009; G06T 5/40; H04N 19/117; H04N 19/126; H04N 19/147; H04N 19/184; H04N 19/186; H04N 19/30; H04N 19/44; H04N 19/91
See application file for complete search history.

(56) References Cited

U.S. PATENT DOCUMENTS

| | | | |
|---|---|---|---|
| 7,715,314 | B2 | 5/2010 | Igarashi et al. |
| 7,983,496 | B2 | 7/2011 | Liu et al. |
| 2003/0103459 | A1 | 6/2003 | Connors et al. |
| 2007/0183451 | A1 | 8/2007 | Lohr et al. |
| 2008/0144550 | A1 | 6/2008 | Makhlouf et al. |
| 2008/0209297 | A1 | 8/2008 | Chandra et al. |
| 2010/0220789 | A1* | 9/2010 | Yuwen .................. H04N 19/33 375/E7.243 |
| 2010/0328490 | A1 | 12/2010 | Kurane |
| 2011/0194618 | A1 | 8/2011 | Gish |
| 2012/0201456 | A1 | 8/2012 | El-Mahdy et al. |
| 2014/0247870 | A1 | 9/2014 | Mertens et al. |
| 2015/0010059 | A1 | 1/2015 | Hattori |
| 2020/0172813 | A1 | 6/2020 | Le Pendu |

FOREIGN PATENT DOCUMENTS

| | | |
|---|---|---|
| CN | 102473295 A | 5/2012 |
| CN | 102696220 A | 9/2012 |
| CN | 102970536 A | 3/2013 |
| CN | 103891294 A | 6/2014 |
| CN | 106062816 B | 11/2019 |
| JP | 2011010108 A | 1/2011 |
| JP | 2012520619 A | 9/2012 |
| WO | 2010105036 | 9/2010 |
| WO | WO-2010105036 A1 * | 9/2010 ........... G06F 3/1423 |
| WO | WO2010105036 A1 | 9/2010 |
| WO | WO2011002505 A1 | 1/2011 |
| WO | 2014002901 A1 | 1/2014 |

OTHER PUBLICATIONS

Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, Document Version 13, 11th Meeting: Shanghai, China, Oct. 10, 2012, pp. 1-317.

Takeuchi et al., "A Coding Method for High Dynamic Range Video Sequence Using Multiple Look-Up Tables," Workshop on Picture Coding and Image Processing, Nagoya, Japan, Dec. 7, 2010, pp. 33-34.

Ferradans et al., "A Multi-Modal Approach to Perceptual Tone Mapping," 2009 6th European Conference for Visual Media Production, London, UK, Nov. 12, 2009, pp. 1-10.

Mai et al., "On-the-Fly Tone Mapping for Backward-Compatible High Dynamic Range Image/Video Compression," 2010 IEEE International Symposium on Circuits and Systems, Paris, France, May 30, 2010, pp. 1831-1834.

Mai et al. "Optimizing a Tone Curve for Backward-Compatible High Dynamic Range Image and Video Compression," IEEE Transactions on Image Processing, vol. 20, No. 6, Jun. 2011, pp. 1558-1571.

Wang et al., "Memory Efficient Hierarchical Lookup Tables for Mass Arbitrary-Side Growing Huffman Trees Decoding," IEEE Transaction on Circuits and Systems for Video Technology, vol. 18, No. 10 Oct. 2008, pp. 1335-1346.

Mai, Zicong, et. al., "Optimizing a Tone Curve for Backward-Compatible High Dynamic Range Image and Video Compression". IEEE Transactions On Image Processing, Dec. 3, 2010, pp. 1-14.

Bross et al., "High Efficiency Video Coding (HEVC) text specification draft 9," Joint Collaborative Team on Video Coding (JCT-VG) of ITU-T SG16 WP3 and ISO/IEC JTC1/SC29/WG11, Document Version 13, 11th Meeting: Shanghai, China, Oct. 10, 2012, pp. 1-317. (317 pages).

Ferradans et al., "A Mul Ti-Modal Approach to Perceptual Tone Mapping," 2009 6th European Conference for Visual Media Production, London, UK, Nov. 12, 2009, pp. 1-10. (10 pages).

Mai et al., "On-the-Fly Tone Mapping for Backward-Compatible High Dynamic Range ImageNideo Compression," 2010 IEEE International Symposium on Circuits and Systems, Paris, France, May 30, 2010, pp. 1831-1834 (4 pages).

Mai et al. "Optimizing a Tone Curve for Backward-Compatible High Dynamic Range Image and Video Compression," IEEE Transactions on Image Processing, vol. 20, No. 6, Jun. 2011, pp. 1558-1571 (14 pages).

Wang et al., "Memory Efficient Hierarchical Lookup Tables for Mass Arbitrary-Side Growing Huffman Trees Decoding," IEEE Transaction on Circuits and Systems for Video Technology, vol. 18, No. 10 Oct. 2008, pp. 1335-1346 (12 pages).

Takeuchi, Masaru, et. al., "A Coding Method For High Dynamic Range Video Sequence Using Multiple Look-Up-Tables". Workshop on Picture Coding and Image Processing, PCSJ2010/IMPS2010, Dec. 7, 2010, pp. 33-34 (2 pages).

* cited by examiner

METHOD AND APPARATUS FOR ENCODING AND DECODING HDR IMAGES

CROSS-REFERENCE TO RELATED APPLICATIONS

This application is a continuation of co-pending U.S. patent application Ser. No. 15/122,149, filed Aug. 26, 2016 which is a national stage application under 35 U.S.C. 371 of International Application No. PCT/EP15/053747, entitled "METHOD AND APPARATUS FOR ENCODING AND DECODING HDR IMAGES", filed on Feb. 23, 2015, which claims the benefit of European Application No. 14305480, filed Apr. 1, 2014 and European Application No. 14305266, filed Feb. 26, 2014 which are incorporated by reference herein in its entirety.

TECHNICAL FIELD

This invention relates to a method and an apparatus for encoding and decoding of High Dynamic Range (HDR) images and videos.

BACKGROUND

Tools for compressing image sequences are often designed to encode integer data with a limited dynamic range. For example, compression standards, such as MPEG-4 AVC/H.264 and HEVC (High Efficiency Video Coding), can be used to compress images and videos whose color components are represented by 8 bit integers. In extended versions of these standards, data with higher bit depths can be taken as input. For example, in the Range Extension version of HEVC, a bit depth up to 16 bits is supported. The high bit-depth extensions may require increased implementation and computational costs. Moreover, for some applications such as 3D computer graphics, there also exist image types whose bit depth is higher than 16 bits.

An alternative solution for encoding high bit-depth images is to apply a tone mapping operator (TMO) on the HDR images to reduce the bit depth and to generate a Low Dynamic Range (LDR) version of the HDR images. A low bit-depth encoder can then be used to compress the LDR version. In this approach, the TMO is usually invertible and the inverse tone mapping should be known to the decoder. An example of this approach is described in an article by Z. Mai et al., titled "On-the-Fly Tone Mapping for Backward-Compatible High Dynamic Range Image/Video Compression," ISCAS 2010, which defines a tone mapping curve that minimizes the data loss caused by both the tone mapping and the encoder error.

SUMMARY

The present principles provide a method for decoding HDR images, comprising: accessing a bitstream having the HDR images included therein; decoding Low Dynamic Range (LDR) images from the bitstream; accessing information from the bitstream, the accessed information including a parameter used to encode the LDR images; and generating the HDR images from the LDR images responsive to the accessed parameter as described below. The present principles also provide an apparatus for performing these steps.

The present principles also provide a method for encoding HDR images, comprising: determining a tone mapping function responsive to the HDR images and at least one encoding parameter; determining LDR images from the HDR images responsive to the tone mapping function; and encoding the determined LDR images and information indicative of the determined tone mapping function, wherein the at least one encoding parameter is used to encode the LDR images as described below. The present principles also provide an apparatus for performing these steps.

The present principles also provide a computer readable storage medium having stored thereon instructions for encoding or decoding HDR images according to the methods described above.

The present principles also provide a computer readable storage medium having stored thereon a bitstream generated according to the methods described above.

DETAILED DESCRIPTION

The present principles are directed to encoding and decoding of HDR images and videos using tone mapping techniques. A tone mapping function takes a high bit-depth integer as input and returns a low bit-depth integer, and an inverse tone mapping function takes a low bit-depth integer as input and returns a high bit-depth integer. In the present application, we use the terms "tone mapping function," "tone mapping curve," and "tone curve" interchangeably, and use the terms "inverse tone mapping function" and "inverse tone mapping curve" interchangeably.

Figure 1:
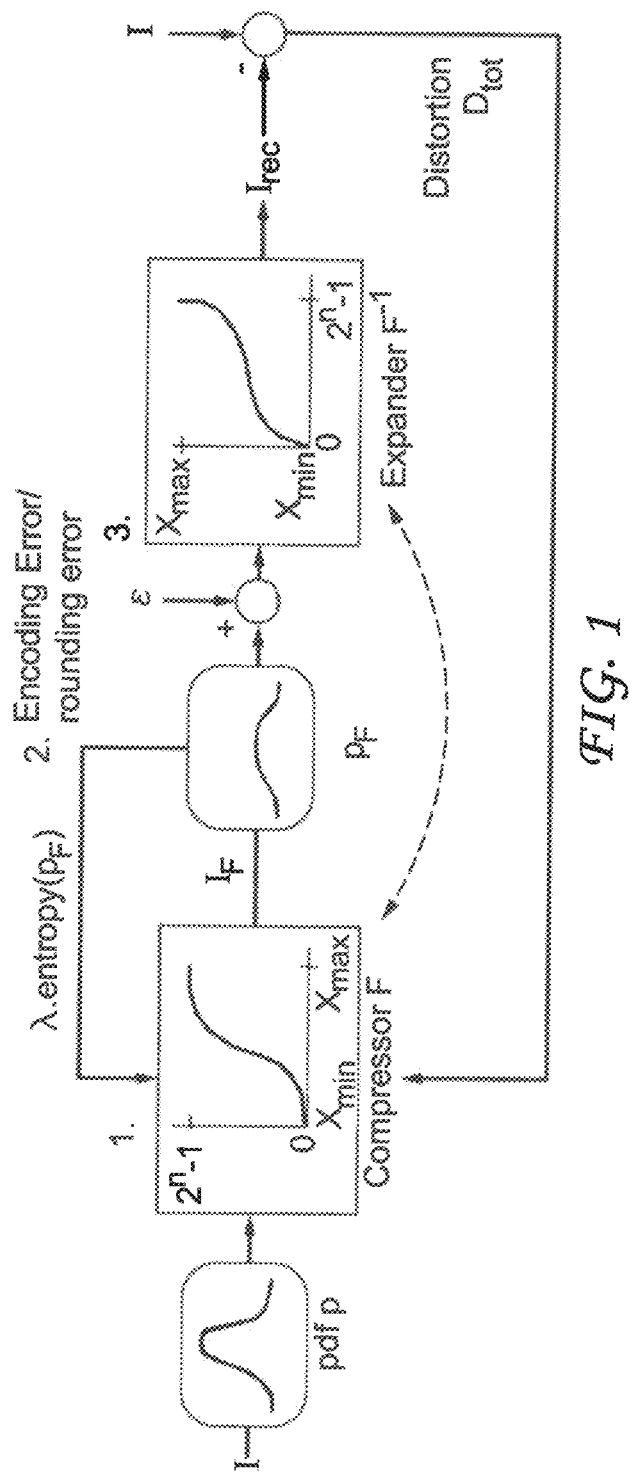
FIG. 1 is a diagram depicting an exemplary mathematical model of a compression scheme, in accordance with an embodiment of the present principles.

In one embodiment, we define a mathematical model of a compression scheme, as illustrated in FIG. 1. In this model, we consider an image is compressed and that pixels have real values (not necessarily integers). The input image I has a probability distribution function (pdf) p and its minimum and maximum pixel values are respectively $x_{min}$ and $x_{max}$.

First, a compressor function F is applied to the pixel values, where F is defined on the interval $[x_{min}, x_{max}]$ and $F(x_{min})=0$ and $F(x_{max})=2^n-1$, where n is the bit depth of the LDR image to be encoded by an LDR encoder. In this mathematical model, the compressor function denotes a continuous and strictly monotonous function that has real valued input and output. These properties ensure that F has an inverse function $F^{-1}$ (denoted as an expander function). When the mathematical model is applied to encoding HDR images, the compressor function corresponds to a tone mapping function whose output is integer. The tone mapping function can be considered as a concatenation of a compressor function and a uniform quantization (rounding). After applying function F, theoretically no data is lost since F is mathematically invertible. We denote the output image from the compressor function as $I_F$, and the probability distribution function of $I_F$ as $p_F$.

Then a random variable ($\varepsilon$) is added to each pixel value to model the encoder error introduced when encoding $I_F$ and rounding error from format conversion if there is any. Here we suppose that the distributions of the random variables do not depend on the positions or the values of the pixels. We also assume that random variable $\varepsilon$ has a zero mean, and a variance $\sigma^2$. After $I_F$ is encoded, the expander $F^{-1}$ is applied to reconstruct HDR image $I_{rec}$.

In the mathematical model, we assume real values are used as input and output. When the mathematical model is actually applied, the input is usually integer, and the output is also integer because we need to generate low bit-depth (for example, 8 bits) integer values to be encoded by an LDR encoder.

To design a tone mapping curve for the model shown in FIG. 1, we formulate a rate distortion function $J=D_{tot}+\lambda_0 \cdot R$, where $D_{tot}$ is the total distortion between the original HDR image I and reconstructed HDR image $I_{rec}$, R is the bit rate of encoding the LDR image, and $\lambda_0$ is a Lagrangian multiplier that is adjusted to improve rate distortion performance. Given an image I and an encoder, we assume that bit rate R of the encoded image is proportional to the entropy of $I_F$. Thus, minimizing $D_{tot}+\lambda_0 \cdot R$ is equivalent to minimizing $D_{tot}+\lambda \cdot \text{entropy}(I_F)$, where $\lambda$ is another Lagrangian multiplier.

In one embodiment, we assume the distortion is measured by mean square error (MSE), that is, $D_{tot}=E\{(I_{rec}-I)^2\}$, where $E\{\cdot\}$ calculates the expectation of a random variable. Our goal is to find function F* that minimizes the rate distortion function $D_{tot}+\lambda \cdot \text{entropy}(I_F)$. It can be shown analytically that the derivative of function F* can be formulated as:

$$F^{*\prime}(x) = \sqrt[3]{\frac{-2\sigma^2 \cdot p(x)}{c + \lambda \cdot p(x) \cdot \log_2(p(x))}} \quad (1)$$

Thus, $$F^*(x) = \int_{x_{min}}^{x} \sqrt[3]{\frac{-2\sigma^2 \cdot p(t)}{c + \lambda \cdot p(t) \cdot \log_2(p(t))}} \, dt \quad (2)$$

where c is a constant that can be adjusted so that $F^*(x_{max})=2^n-1$.

However, we don't have an analytical solution to determine the value of c given $\lambda$ and $\sigma$. Moreover, a model of the actual encoder used and the encoding parameters (for example, but not limited to, quantization parameter QP in HEVC and bit depth of the LDR image) would be needed to find the value of $\sigma$. To eliminate the dependence of function F*(x) on variables c and $\sigma$, we define a function $$S(x, \lambda_i) = \int_{x_{min}}^{x} \sqrt[3]{\frac{-2 \cdot p(t)}{-1 + \lambda_i \cdot p(t) \cdot \log_2(p(t))}} \, dt \quad (3)$$

It can be shown that for any positive value $\lambda$ and $\sigma$, there exist a value $\lambda_i \in \mathbb{R}$ such that:

$$\forall x \in [x_{min}, x_{max}], F^*(x) = (2^n - 1)\frac{S(x, \lambda_i)}{S(x_{max}, \lambda_i)} \quad (4)$$

Consequently, only parameter $\lambda_i$ is needed to derive the tone mapping function. In one embodiment, we can compute $S(x, \lambda_i)$ by numerical integration and divide the result by $S(x_{max}, \lambda_i)$.

Figure 2:
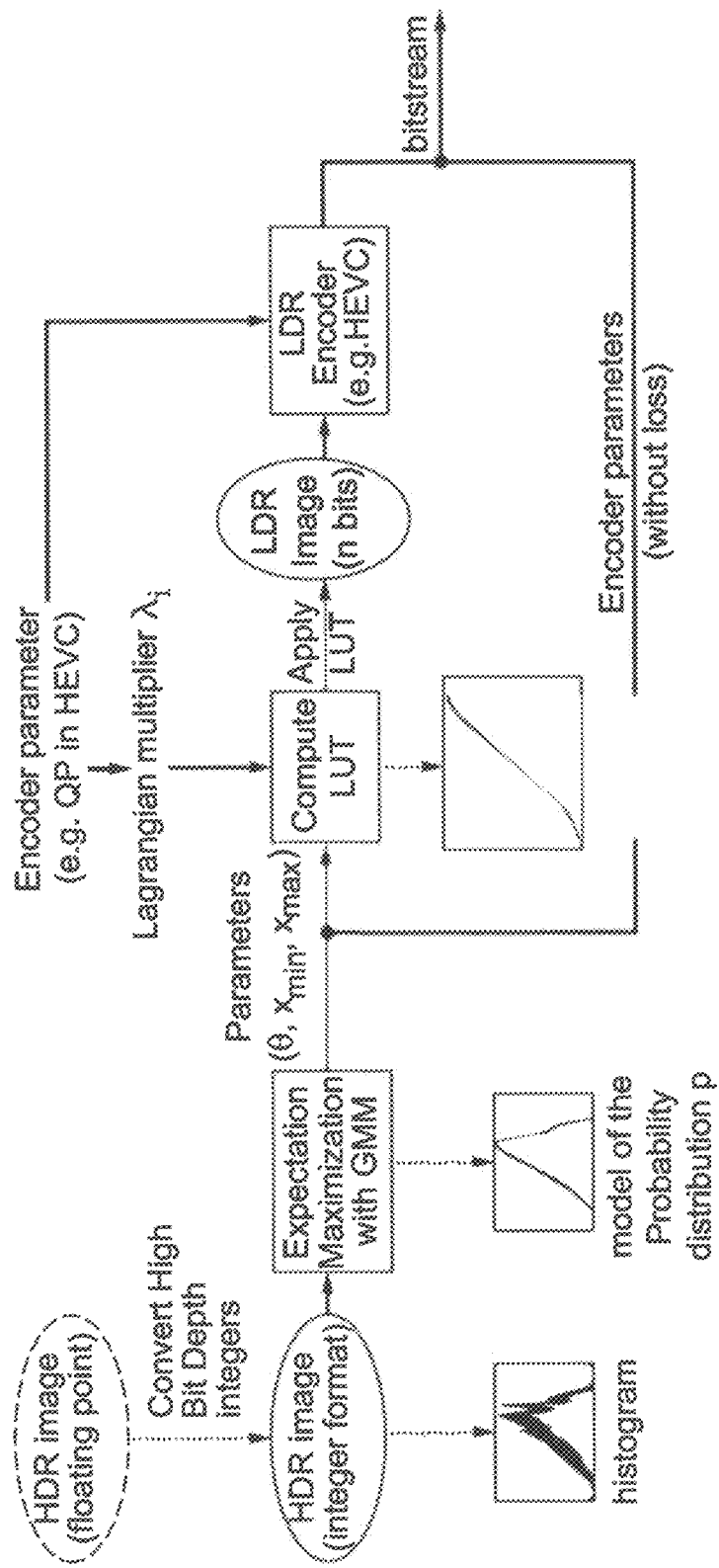
FIG. 2 is a diagram depicting an exemplary scheme of encoding HDR images using tone mapping, in accordance with an embodiment of the present principles.

FIG. 2 illustrates an exemplary embodiment of encoding HDR images using tone mapping according to the present principles. The pixel values of the input HDR image may be originally represented by high bit-depth integers or floating point values. If the HDR images are represented by floating point values, a conversion to integer can be used. For example, if the input image is defined in the half float format, taking the bit pattern (i.e., 1 sign bit, 5 exponent bits and 10 mantissa bits) interpreted as an integer provides a lossless conversion from floating point to 16-bit integer. If the image contains only positive values, this conversion approximates a log encoding of the original floating point values.

In another example, we may apply a logarithm function to the floating point values and round the result to integers. In that case, the function used should be adjusted so that the zero and the maximum floating point values are mapped respectively to 0 and $2^{n_{HDR}}-1$, where $n_{HDR}$ is the bit depth of the integer version of the HDR image. A reasonable choice for the value of $n_{HDR}$ is 16 if the original image is in the half float format (i.e., 16 bits floating point values), or $n_{HDR}=32$ if the original image is in the single precision float format (i.e., 32 bits floating point values). The corresponding inverse conversion function should be applied to the decoded integer HDR image in order to convert it back to floating point data.

Then, Expectation Maximization is performed to obtain a Gaussian mixture model of the probability distribution function p of the pixel values. The GMM model is described by parameter set θ (mean, variance, weight of the Gaussians). θ, $x_{min}$ and $x_{max}$ (minimum and maximum pixel values of the image are used to compute the tone mapping LUT. A Lagrangian multiplier $\lambda_i$ computed from encoding parameter QP is also taken into account for the LUT computation. Then, the LUT is applied to the image to obtain an LDR version which is sent to an LDR encoder using encoding parameter QP. Finally, the parameters θ, $x_{min}$ and $x_{max}$ are indicated in the bitstream representative of the LDR image. In the following, we describe the determination of the probability distribution function and the Lagrangian multiplier in further detail.

Probability Distribution Function Determination

To derive the tone mapping function as described in Eq. (4), the probability distribution function (p(x)) of the pixel values needs to be determined. In one example, p(x) can be determined by computing the histogram of the image. In order for the decoder to compute the inverse tone mapping curve, the parameters defining the probability distribution function need to be known at the decoder. To reduce the number of parameters that need to be encoded to represent p(x), we may parameterize the histogram.

In one embodiment, we can use a Gaussian mixture model to fit the histogram, where a GMM is a weighted sum of several Gaussians. The model parameters are variance $v_j$, mean value $\mu_j$ and weight $\alpha_j$ of each Gaussian j in the mixture model. The model of the probability distribution function can be formulated as:

$$p(x) = \sum_{j=1}^{m} \alpha_j g(x, \mu_j, v_j) \quad (5)$$

where m is the number of Gaussians used in the model, and g is a Gaussian function:

$$g(x, \mu_j, v_j) = \frac{1}{\sqrt{2\pi v_j}} \cdot e^{-\frac{(x-\mu_j)^2}{2v_j}} \quad (6)$$

The Expectation Maximization (EM) algorithm can be used for the fitting operation. This algorithm is defined in an article by Dempster et al., titled "Maximum Likelihood from Incomplete Data via the EM Algorithm," Journal of the Royal Statistical Society, 1977. Given a number m of Gaussian models and an initial parameter set $\theta^0 = (\alpha_j^0, \mu_j^0, v_1^0)$ (j ∈ [1, m]), the objective is to find θ that maximizes the log-likelihood function:

$$J(\theta) = \ln \Pi_{i=1}^{N} p(x_i) \quad (7)$$

where N is the number of pixels and $x_i$ is the value of the pixel i.

Each iteration k of the algorithm is composed of the following steps:

1. For each j in [1,m], and i in [1,N], compute:

$$\gamma_{i,j} = \frac{\alpha_j^{k-1} g(x_i, \mu_j^{k-1}, v_j^{k-1})}{\sum_{l=1}^{m} \alpha_l^{k-1} g(x_i, \mu_l^{k-1}, v_l^{k-1})} \text{ and } N_j = \sum_{i=1}^{N} \gamma_{i,j}$$

2. Compute the new means: $\mu_j^k = \frac{1}{N_j} \sum_{i=1}^{N} \gamma_{i,j} x_i$ 3. Compute the new variance: $v_j^k = \frac{1}{N_j} \sum_{i=1}^{N} \gamma_{i,j} (x_i - \mu_j^k)^2$ 4. Compute the new weights: $\alpha_j^k = \frac{N_j}{N}$ 5. Stop if convergence is reached (i.e. $|J(\theta^{k-1}) - J(\theta^k)| <$ Threshold), (e.g., Threshold = $10^{-9}$). Otherwise, do next iteration.

Figure 3A:
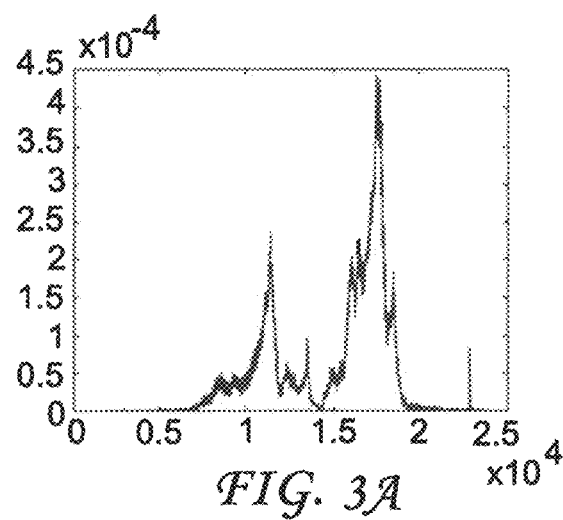
FIG. 3A is a pictorial example depicting a histogram.
Figure 3B:
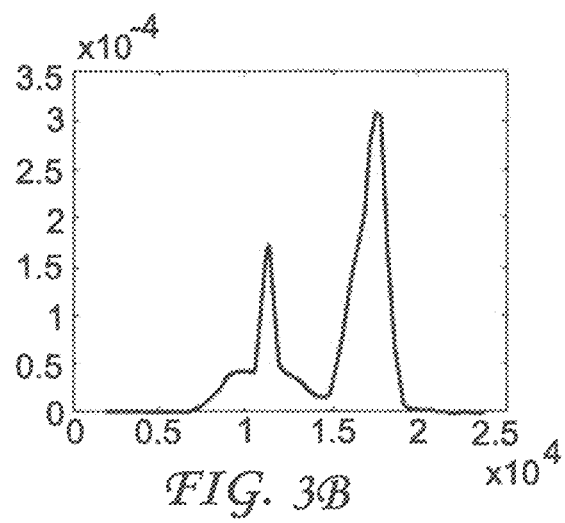
FIG. 3B is a pictorial example depicting the fitted Gaussian Mixture Model (GMM) for the histogram in FIG. 3A with Expectation Maximization.

The GMM parameters obtained by EM can then be used to compute the probability distribution function at any integer value x from $x_{min}$ to $x_{max}$ with Eq. (5). FIG. 3A shows an exemplary histogram, and FIG. 3B shows the fitted GMM with EM.

We consider that the probability of the pixels beyond the range [$x_{min}$, $x_{max}$] is null. Thus, in addition to the GMM parameters, the minimum and maximum values $x_{min}$ and $x_{max}$ are also to be indicated in the bitstream for the decoder to generate the probability distribution function.

In HDR images, it is possible that an image contains a small number of pixels with very low values. As those pixels may disturb the computation of the algorithm, we may clip the values below a given percentile (for example, at 0.1%) before performing the EM algorithm. In that case, the value of $x_{low}$ is used as $x_{min}$. Similarly, if the image contains a small number of pixels with very high values, we may clip the high values below a given percentile before performing the EM algorithm. In that case, the value of $x_{high}$ is used as $x_{max}$.

Lagrangian Multiplier Determination

To derive the tone mapping function as described in Eq. (4), we also need to determine the Lagrangian multiplier $\lambda_i$. The value of $\lambda_i$ may depend on the encoder in use (e.g., HEVC, MPEG-2, MPEG-4 AVC/H.264, or JPEG), the bit depth of the input data format accepted by the LDR encoder, and encoding parameters (e.g., quantization parameter QP in HEVC). In the following, we discuss how to determine Lagrangian multiplier $\lambda_i$ in further detail.

Figure 4:
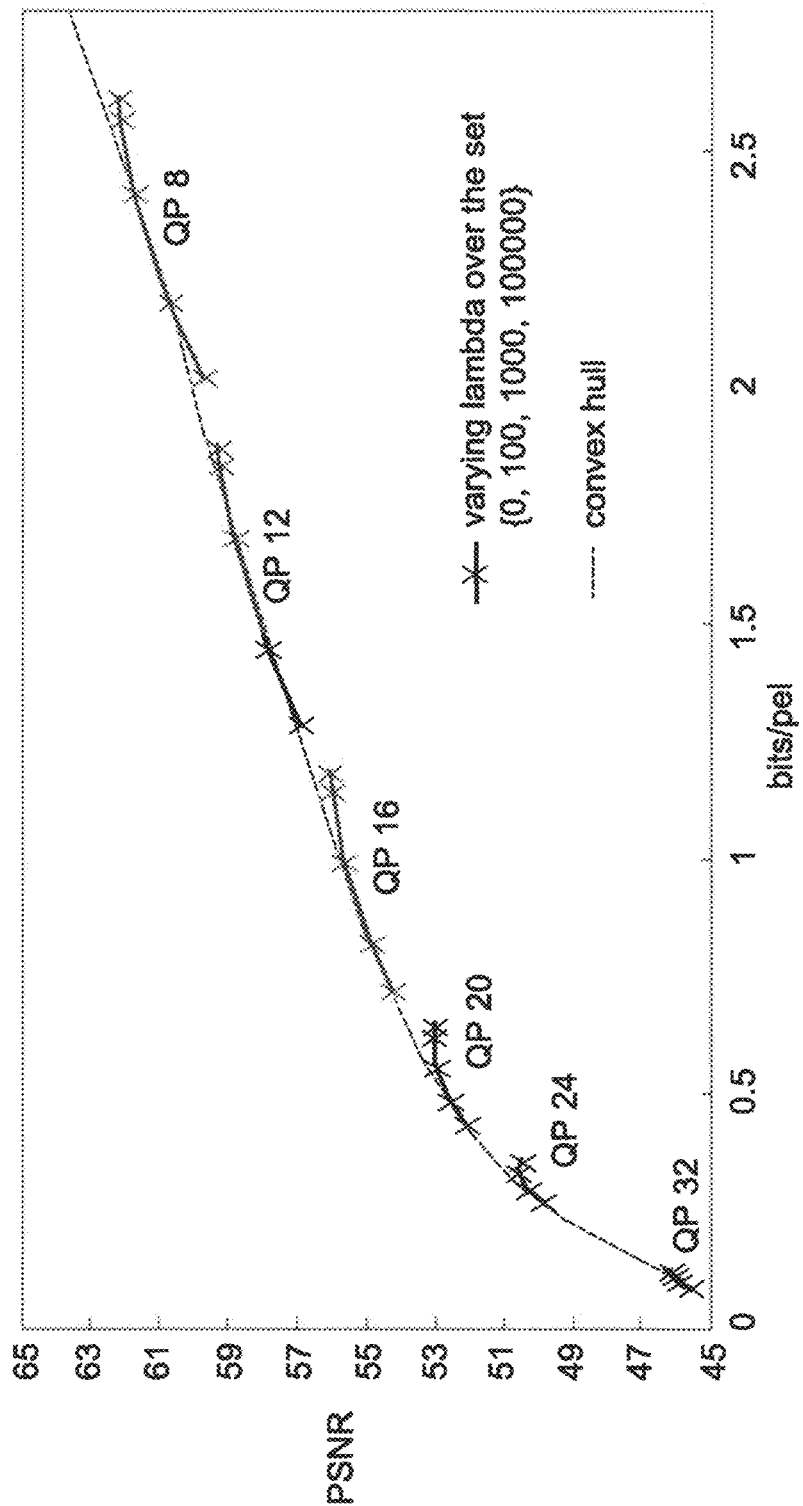
FIG. 4 is a pictorial example depicting rate distortion results for the encoding of an HDR image over varying lambda values and QP parameters.

In one embodiment, we may encode several images with several quality parameters (e.g., QP value for HEVC) and $\lambda_i$ values. For a given image at each QP, the encoding is performed several times by varying the value of $\lambda_i$ over a large range. Given a QP value, the Rate Distortion (RD) point obtained with the optimal $\lambda_i$ is on the convex hull of the set of all the RD points, as illustrated in FIG. 4. Thus, we can derive the Lagrangian multiplier $\lambda_i^*$ as a function of QP. For example, when 16-bit images are tone mapped to 8-bit and encoded with HEVC, the following exponential function was found to represent the Lagrangian multiplier:

$$\lambda_i^* = 100 * 2^{0.37 QP} \quad (8)$$

Given the function described in Eq. (8), the same value of $\lambda_i$ can be derived at the encoder and the decoder, since the QP value is known by the decoder.

Lookup Table Generation

In one embodiment, we may need to perform numerical integration to implement the present principles. Since computing the sum for every pixel would be very time consuming, we may compute the sum, as shown below in Eq. (10) for a value x by cumulating the result at x−1. Other methods may be used to perform numerical operations.

As explained before, the function F*' can be computed from Eq. (9) given a value $\lambda_i$ and the probability distribution p:

$$F^{*'}(x) = \sqrt[3]{\frac{-2 \cdot p(x)}{-1 + \lambda_i \cdot p(x) \cdot \log_2(p(x))}} \qquad (9)$$

When the value of F*' is computed for each integer value $x \in [x_{min}, x_{max}]$, it can be integrated numerically to compute $F_{num}$, which approximates the function S defined in Eq. (3). For example, a cumulative sum can be performed as:

$$F_{num}(x) = \Sigma_{i=x_{min}}^{x-1} F^{*'}(i) \qquad (10)$$

We may generate a lookup table (LUT) to represent the tone mapping curve. In particular, function F may be scaled and rounded to obtain integers with the required bit depth n for the LDR image:

$$LUT(x) = \left[ (2^n - 1) \frac{F_{num}(x)}{F_{num}(x_{max})} \right] \qquad (11)$$

Note that $$\frac{F_{num}(x)}{F_{num}(x_{max})}$$

is the numerical approximation of $$\frac{S(x, \lambda_i)}{S(x_{max}, \lambda_i)}$$

from Eq. (4). After the LUT is generated, the tone mapping operation can apply the LUT to every pixel of the original HDR image. The image obtained is then compressed with an LDR encoder. The parameters used for the construction of the tone mapping curve (for example, probability distribution function parameters, $x_{min}$, $x_{max}$) need to be communicated to the decoder, for example, using lossless coding.

Figure 5:
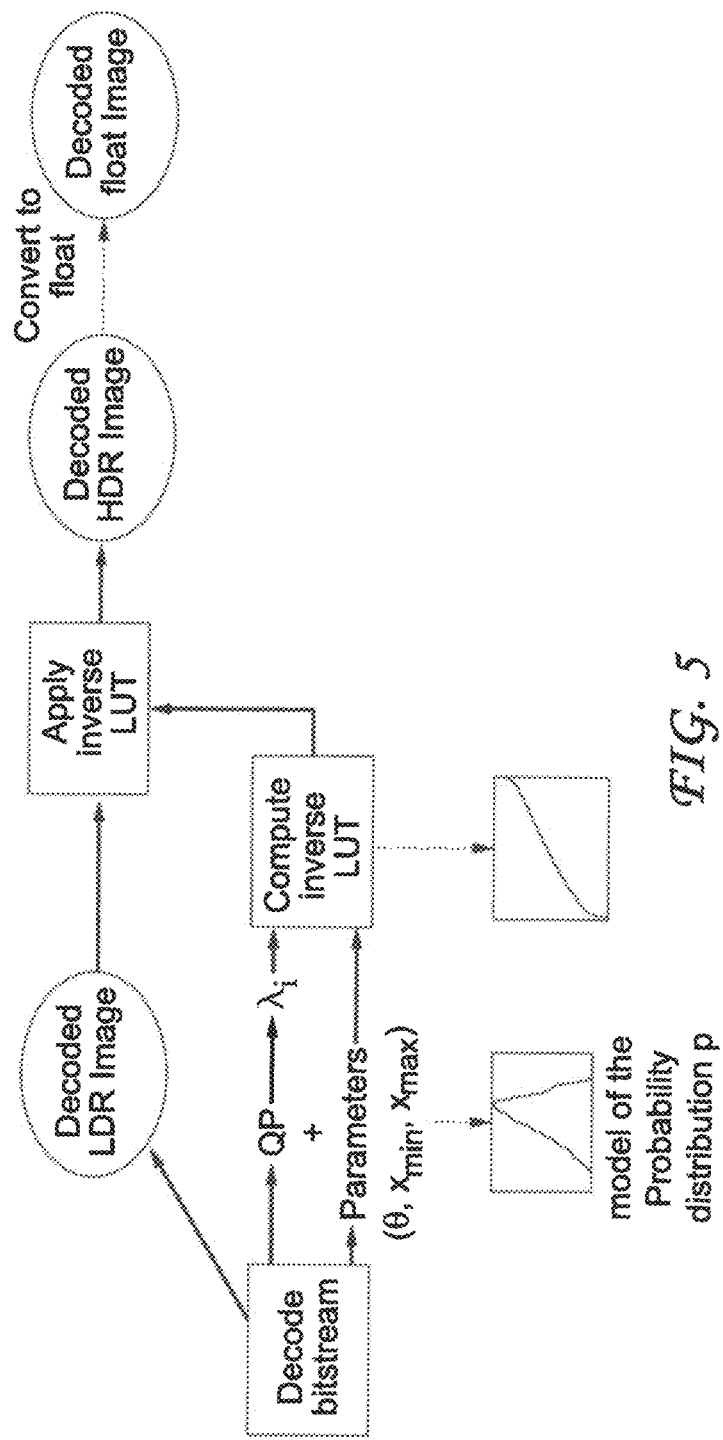
FIG. 5 is a diagram depicting an exemplary scheme of decoding HDR images using inverse tone mapping, in accordance with an embodiment of the present principles.

FIG. 5 illustrates an exemplary embodiment of decoding HDR images using inverse tone mapping according to the present principles. The input bitstream of FIG. 5 may be generated according to FIG. 2. The LDR images and the model parameters (e.g., θ, $x_{min}$, $x_{max}$ and the QP) can be decoded from the bitstream. Knowing the parameters, the operations described in Eqs. (5), (9), (10) and (11) can be performed to generate a tone mapping lookup table. Then the LUT is inverted to generate the inverse tone mapping lookup table. The inverse LUT is applied to the decoded LDR image to reconstruct the HDR image. If the original image is defined in a floating point format, the reconstructed HDR image can be converted back from integer to floating point.

Figure 6A:
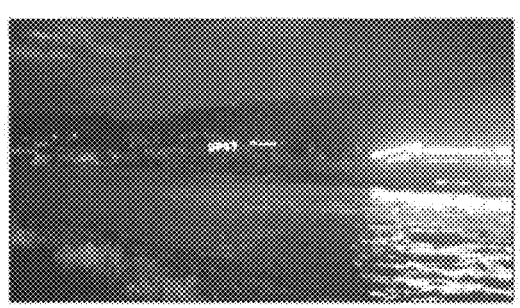
FIG. 6A shows image "Peniches.
Figure 6B:
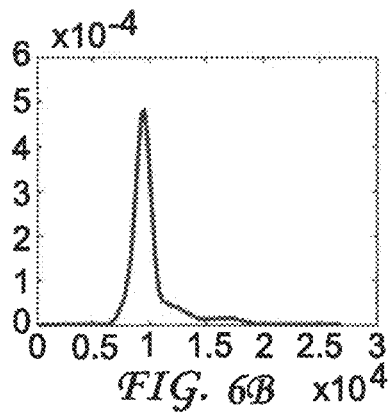
" FIG. 6B shows the estimated probability distribution function for image "Peniches.
Figure 6C:
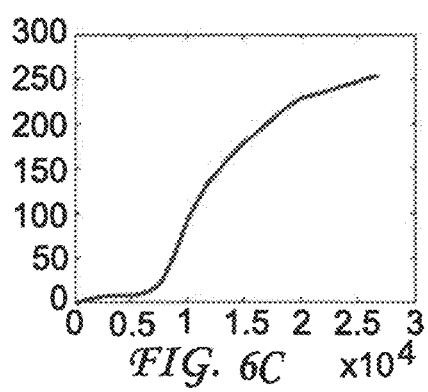
" FIGS. 6C and 6D show tone mapping LUT and inverse tone mapping LUT, respectively, when QP=0.
Figure 6D:
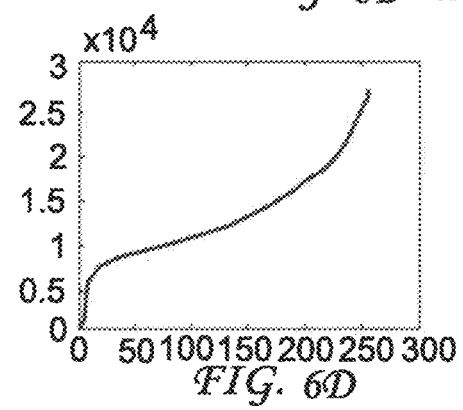
Figure 6E:
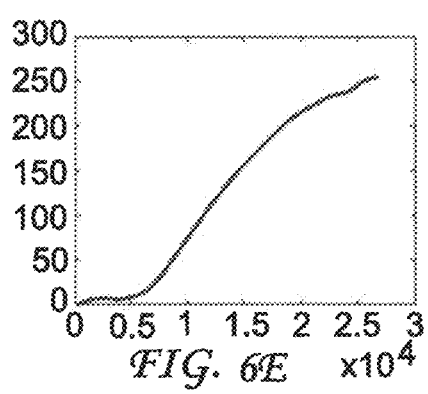
FIGS. 6E and 6F show tone mapping LUT and inverse tone mapping LUT, respectively, when QP=16.
Figure 6F:
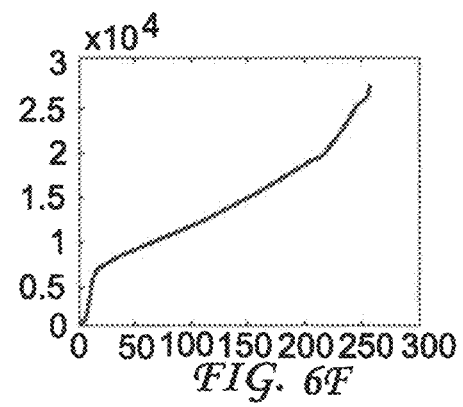
Figure 6G:
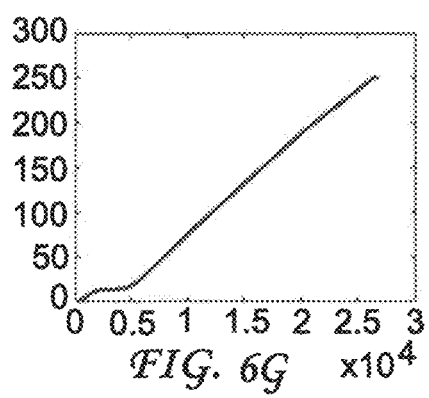
FIGS. 6G and 6H show tone mapping LUT and inverse tone mapping LUT, respectively, when QP=32.
Figure 6H:
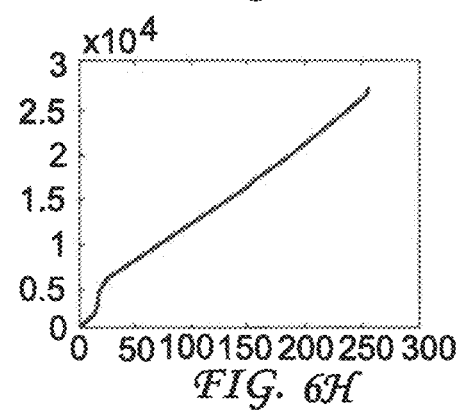

FIGS. 6A-6H and 7A-7H illustrate examples of input 16-bit HDR images, probability distribution functions, and tone mapping curves and inversion tone mapping curves for conversion between 16-bit images and 8-bit images, when an HEVC encoder is used as an LDR encoder. FIG. 6A shows image "Péniches," with $x_{min}=0$ and $x_{max}=27024$. FIG. 6B shows the estimated probability distribution function for image "Péniches." FIGS. 6C and 6D show tone mapping LUT and inverse tone mapping LUT, respectively, when QP=0 ($\lambda_i=100$). FIGS. 6E and 6F show tone mapping LUT and inverse tone mapping LUT, respectively, when QP=16 ($\lambda_i=6055$). FIGS. 6G and 6H show tone mapping LUT and inverse tone mapping LUT, respectively, when QP=32 ($\lambda_i=3.67e+05$).

Figure 7A:
FIG. 7A shows image "Mongolfiere.
Figure 7B:
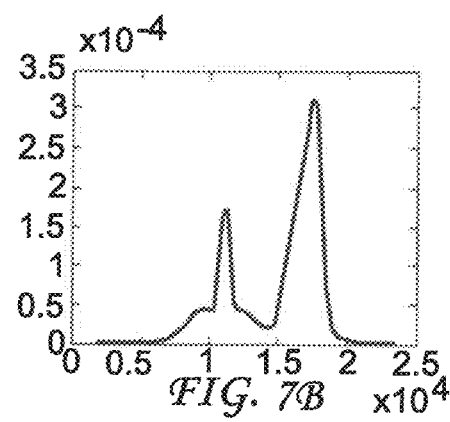
" FIG. 7B shows the estimated probability distribution function for image "Mongolfiere.
Figure 7C:
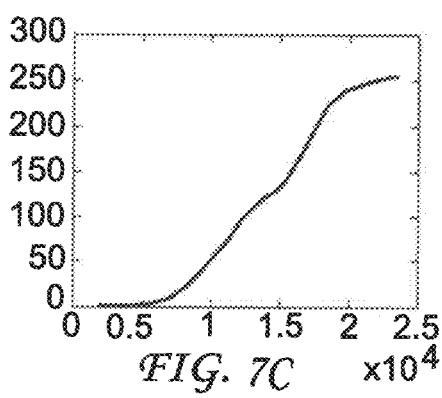
" FIGS. 7C and 7D show tone mapping LUT and inverse tone mapping LUT, respectively, when QP=0.
Figure 7D:
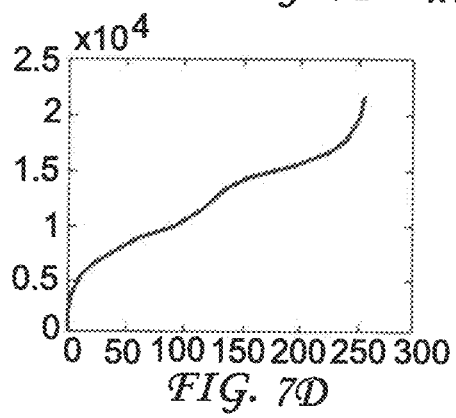
Figure 7E:
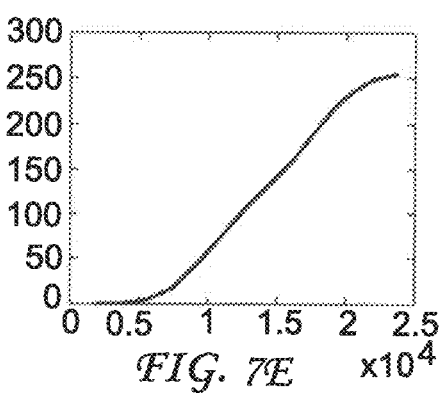
FIGS. 7E and 7F show tone mapping LUT and inverse tone mapping LUT, respectively, when QP=16.
Figure 7F:
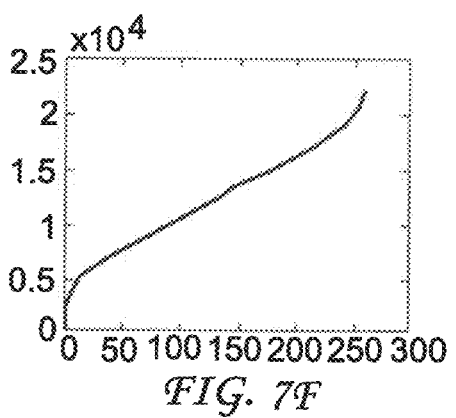
Figure 7G:
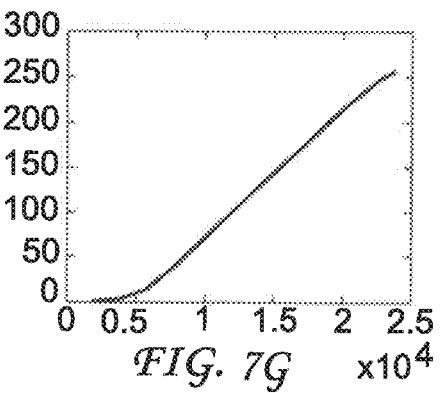
FIGS. 7G and 7H show tone mapping LUT and inverse tone mapping LUT, respectively, when QP=32.
Figure 7H:
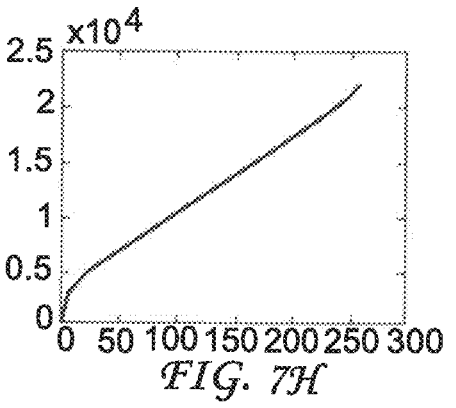

FIG. 7A shows image "Mongolfière," with $x_{min}=1834$ and $x_{max}=23634$. FIG. 7B shows the estimated probability distribution function for image "Mongolfière." FIGS. 7C and 7D show tone mapping LUT and inverse tone mapping LUT, respectively, when QP=0 ($\lambda_i=100$). FIGS. 7E and 7F show tone mapping LUT and inverse tone mapping LUT, respectively, when QP=16 ($\lambda_i=6055$). FIGS. 7G and 7H show tone mapping LUT and inverse tone mapping LUT, respectively, when QP=32 ($\lambda_i=3.67e+05$).

We observe from FIGS. 6A-6H and 7A-7H that the tone mapping curves are smoother at higher QP values (and higher $\lambda_i$). At lower QPs, the tone mapping curve is more dependent on the probability distribution function, and the slope of the curve is steeper at high probable values. As a consequence, those values will be tone mapped with more precision.

When determining the tone mapping curve at the encoder, we discussed above that MSE can be used to measure the distortion and Expectation Maximization with GMM can be used to estimate the probability distribution. In a variation, instead of the mean square error, we can choose the sum of absolute difference (SAD) as a distortion metric. In this case, the cube root in Eqs. (1)-(3) will be replaced by a square root.

In another variation, we may compute a light version of the histogram and model the probability distribution function with a few parameters. Specifically, instead of computing the full histogram containing the number of pixels of the image at each integer value, we can divide the range [$x_{min}$, $x_{min}$] into a small number of intervals of the same length. For each interval K, the number $N_K$ of pixels of the image falling into this interval can be computed. Then for each value x in the interval K the probability is estimated by $$p(x) = \frac{N_K}{\text{total number of pixels}}.$$

Figure 3C:
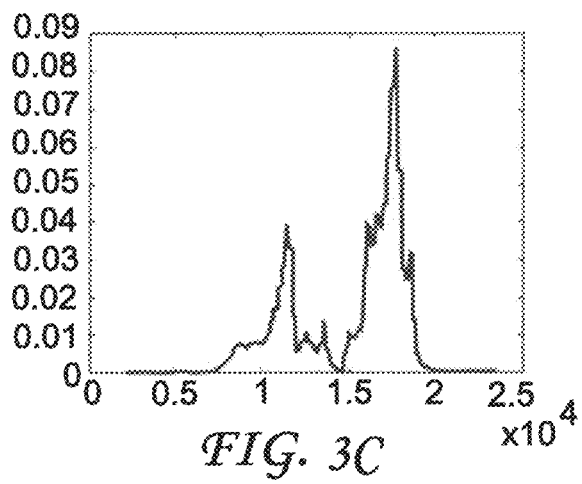
FIG. 3C is a pictorial example depicting the probability distribution function computed with 100 intervals, in accordance with an embodiment of the present principles.

For example, we can take 100 intervals, and 100 values $N_K$ ($K \in [1,100]$) and the values $x_{min}$ and $x_{max}$ need to be communicated to the decoder. For the exemplary histogram shown in FIG. 3A, FIG. 3C shows the probability distribution function computed with 100 intervals.

Various encoders, for example, encoders conforming to MPEG-2, MPEG-4 AVC/H.264, and HEVC can be used as an LDR encoder. The LDR encoder may also be a base layer encoder of a bit depth scalable video encoder. In the above examples, we assume that the bitrate used for encoding parameters indicative of the tone mapping function is negligible and is not included in the Rate Distortion minimization problem. We may also include the bitrate for these parameters in our model if it becomes more significant. In the above, we have used one image as an input. The present principles can also be applied when a video sequence is used as input and we may vary the parameters from image to image.

Several numerical values have been used above, for example, to provide examples for $\lambda_i$ computation, histogram intervals, and the very low and high pixel values with a small percentage. These numerical values can be changed as the input images and/or encoding settings change.

The present principles have the advantage of taking both the distortion of the reconstructed HDR image and the rate for encoding the HDR image into account when designing a tone mapping curve with respect to the rate distortion performance. The tone mapping curve and inverse tone mapping curve according to our principles not only depend on the input HDR image characteristics, but also take into consideration of the impact of the encoding settings. In one embodiment, we indicate in the bitstream a set of parameters (i.e., $\theta$, $x_{min}$, $x_{max}$) that are inherent to the input images. Based on this set of inherent parameters and an encoding parameter (for example, a quantization parameter), we can generate different sets of tone mapping curves and inverse tone mapping curves adaptive to the quantization parameter, and thus the bitrate. The inverse tone mapping curve necessary for the HDR reconstruction does not need to be transmitted explicitly. Rather, it can be computed by the decoder from the encoding parameter and the set of parameters that are inherent to the input images. Consequently, the methods according to the present principles are adaptive to the encoding settings (for example, the bitrate) and may improve the compression efficiency when encoding HDR images.

Figure 8:
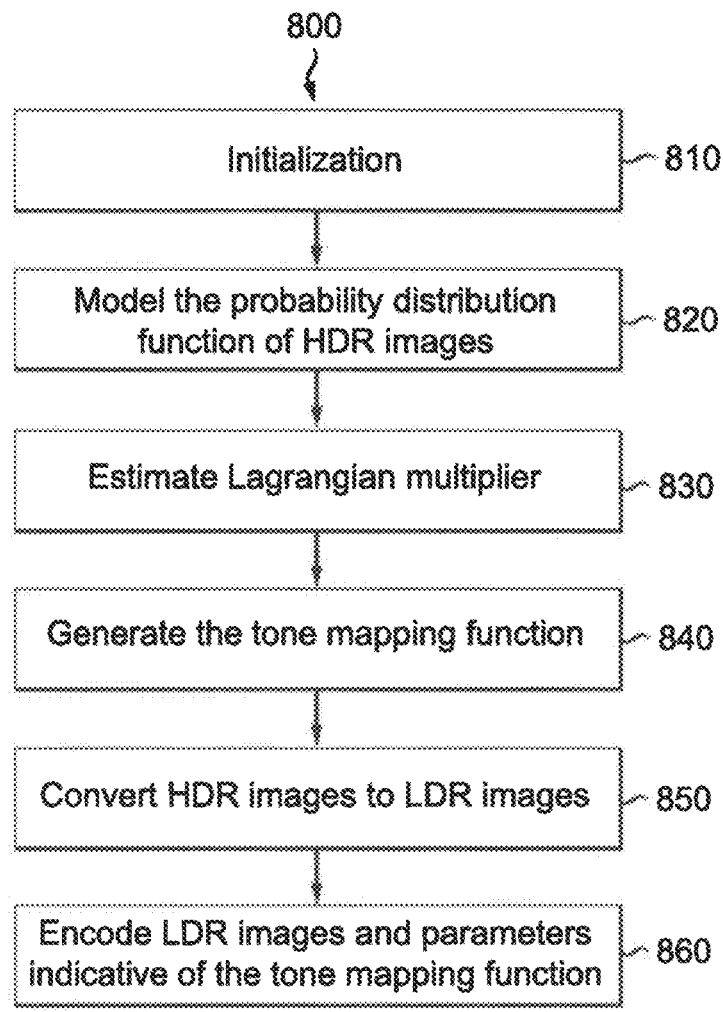
FIG. 8 is a flow diagram depicting an exemplary method for encoding HDR images, in accordance with an embodiment of the present principles.

FIG. 8 illustrates an exemplary method 800 for encoding HDR images according to the present principles. Method 800 starts at initialization step 810, which may determine the format of the input HDR images and the accepted format of the LDR images. At step 820, it models the probability distribution function of HDR images, for example, using Expectation Maximization with GMM or using a light version of the histogram.

At step 830, the Lagrangian multiplier is estimated, for example, as a function of a quantization parameter. Since the Lagrangian multiplier may depend on encoder settings, for example, the video compression standard in use and the bit depth of the format of the LDR encoder, we may communicate the function to compute the Lagrangian multiplier to the decoder, or both the encoder and decoder may store the Lagrangian multiplier as a pre-determined number.

Based on the probability distribution function modelled at step 820 and the Lagrangian multiplier estimated at step 830, a tone mapping function can be generated 840, for example, according to Eq. (4). To perform numerical operation, a lookup table may be generated. At step 850, the HDR images are converted to LDR images using the tone mapping function. The LDR images and parameters indicative of the tone mapping function, such as the parameters indicating the probability distribution function, are encoded in the bitstream at step 860.

Method 800 may proceed in a different order from what is shown in FIG. 8, for example, step 830 may be performed before step 820. Since the Lagrangian multiplier may not depend on the input images, it may be derived before encoding the input HDR images. Thus, step 830 can be optional.

Figure 9:
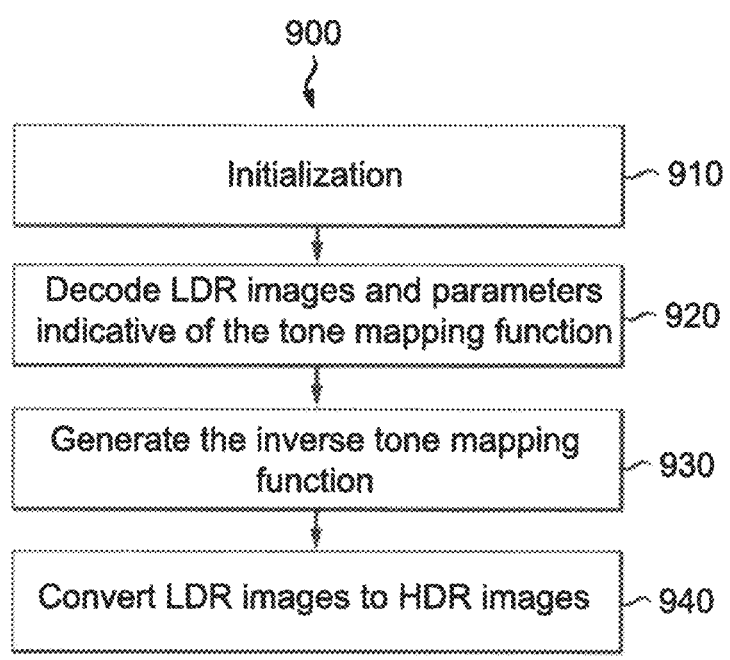
FIG. 9 is a flow diagram depicting an exemplary method for decoding HDR images, in accordance with an embodiment of the present principles.

FIG. 9 illustrates an exemplary method 900 for decoding HDR images according to the present principles. The input of method 900 may be a bitstream generated according to method 800. Method 900 starts at initialization step 910, which may determine the format of the reconstructed HDR images. At step 920, the LDR images and parameters indicative of the tone mapping function are decoded. Based on the parameters indicative of the tone mapping function, a tone mapping function can be generated, for example, according to Eq. (4). Subsequently, an inverse tone mapping function can be generated at step 930. Similar to what is performed at method 800, a lookup table and an inverse lookup table can be generated to perform numerical operations. At step 940, the LDR images are converted to HDR images using the inverse tone mapping function.

Figure 10:
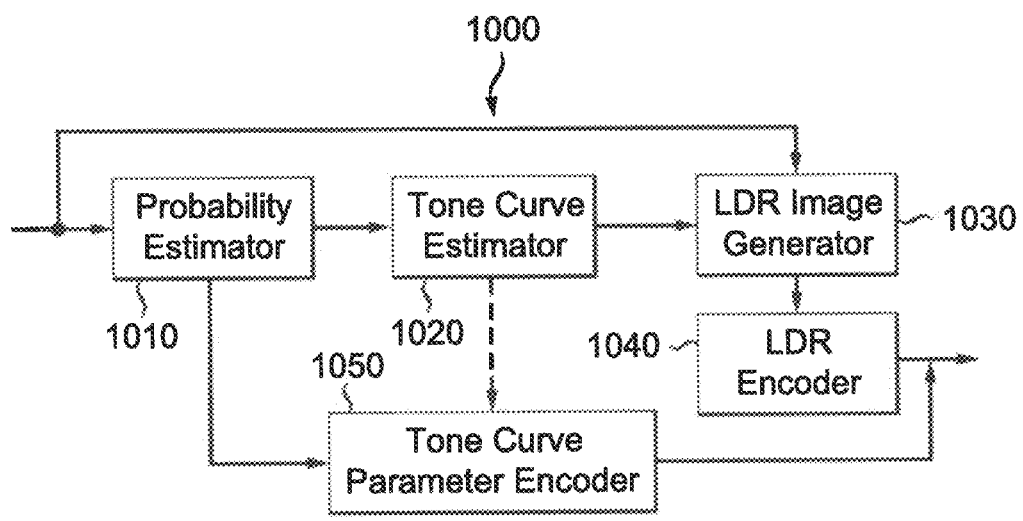
FIG. 10 is a block diagram depicting an exemplary system for encoding HDR images, in accordance with an embodiment of the present principles.

FIG. 10 depicts a block diagram of an exemplary encoder 1000 for encoding HDR images. The input of encoder 1000 includes the HDR images to be encoded, encoding parameters, and/or other images that may be used to estimate the Lagrangian multiplier. Probability estimator 1010 estimates the probability distribution function of the input images. Tone curve estimator 1020 estimates the Lagrangian multiplier, for example, based on a quantization parameter, and generates the tone mapping curve based on probability distribution function parameters and the Lagrangian multiplier, for example, using Eq. (4). Based on the tone mapping curve, LDR image generator 1030 converts the input HDR images into LDR images. LDR encoder 1040 encodes the LDR images and tone curve parameter encoder 1050 encodes the parameters indicative of the tone mapping function, such as probability distribution function parameters and the minimum and maximum pixel values of the input images. If parameters for describing Lagrangian multiplier are to be indicated in the bitstream, these parameters will also be encoded by tone curve parameter encoder 1050. Tone curve parameter encoder 1050 can be a standalone module, or it can be included within LDR encoder 1040.

Figure 11:
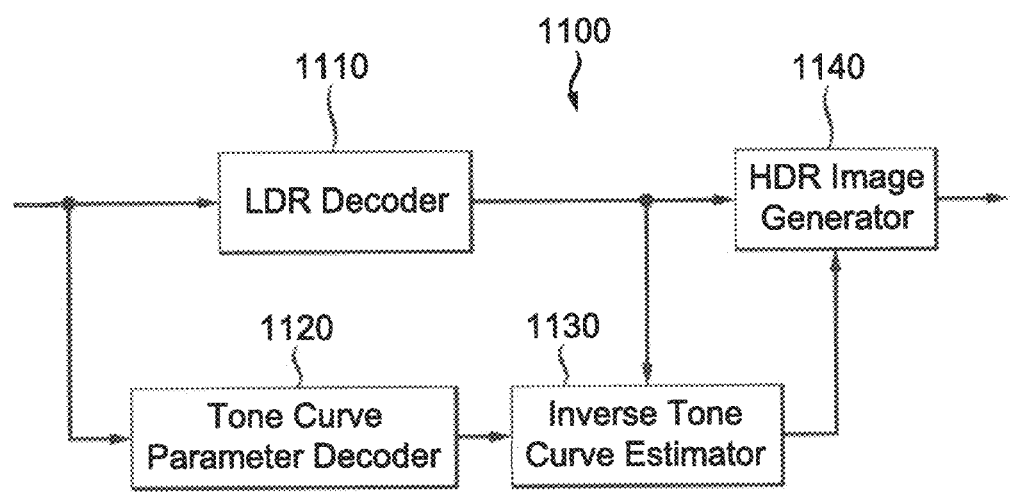
FIG. 11 is a block diagram depicting an exemplary system for decoding HDR images, in accordance with an embodiment of the present principles.

FIG. 11 depicts a block diagram of an exemplary decoder 1100 for decoding HDR images. The input of decoder 1100 includes a bitstream to be decoded. The input bitstream may be generated by encoder 1000. LDR decoder 1100 decodes the LDR images and tone curve parameter decoder 1120 decodes the parameters indicative of the tone mapping function, such as probability distribution function parameters and the minimum and maximum pixel values of the input images. Tone curve parameter decoder 1120 can be a standalone module, or it can be included within LDR decoder 1110.

Inverse tone curve estimator 1130 estimates parameters, such as the Lagrangian multiplier based on a quantization parameter decoded from the bitstream, and generates the tone mapping curve, for example, using Eq. (4). Based on the inverse tone mapping curve, HDR image generator 1140 converts the decoded LDR images to HDR images.

Figure 12:
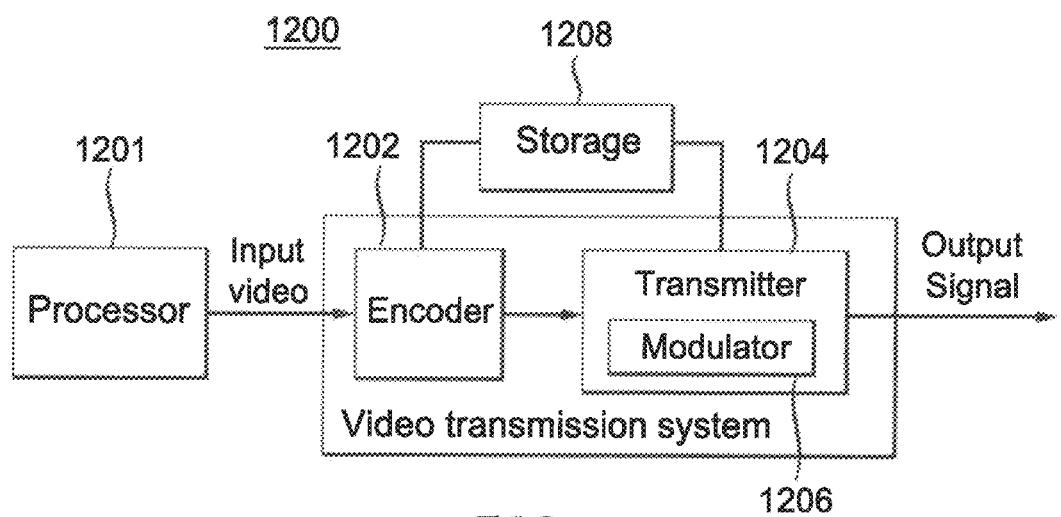
FIG. 12 is a block diagram depicting an example of an image processing system that may be used with one or more implementations.

Referring now to FIG. 12, a data transmission system or apparatus 1200 is shown, to which the features and principles described above may be applied. The data transmission system or apparatus 1200 may be, for example, a head-end or transmission system for transmitting a signal using any of a variety of media, such as, for example, satellite, cable, telephone-line, or terrestrial broadcast. The data transmission system or apparatus 1200 also, or alternatively, may be used, for example, to provide a signal for storage. The transmission may be provided over the Internet or some other network. The data transmission system or apparatus 1200 is capable of generating and delivering, for example, video content and other contents.

The data transmission system or apparatus 1200 receives processed data and other information from a processor 1201. In one implementation, the processor 1201 converts HDR images to LDR images. The data transmission system or apparatus 1200 includes an encoder 1202 and a transmitter 1204 capable of transmitting the encoded signal. The encoder 1202 receives data information from the processor 1201. The encoder 1202 generates an encoded signal(s). In some implementations, the encoder 1202 includes the processor 1201 and therefore performs the operations of the processor 1201.

The transmitter 1204 receives the encoded signal(s) from the encoder 1202 and transmits the encoded signal(s) in one or more output signals. The transmitter 1204 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 12012. The transmitter 1204 may include, or interface with, an antenna (not shown). Further, implementations of the transmitter 1204 may be limited to the modulator 12012.

The data transmission system or apparatus 1200 is also communicatively coupled to a storage unit 1208. In one implementation, the storage unit 1208 is coupled to the encoder 1202, and stores an encoded bitstream from the encoder 1202. In another implementation, the storage unit 1208 is coupled to the transmitter 1204, and stores a bitstream from the transmitter 1204. The bitstream from the transmitter 1204 may include, for example, one or more encoded bitstream that has been further processed by the transmitter 1204. The storage unit 1208 is, in different implementations, one or more of a standard DVD, a Blu-Ray disc, a hard drive, or some other storage device.

Figure 13:
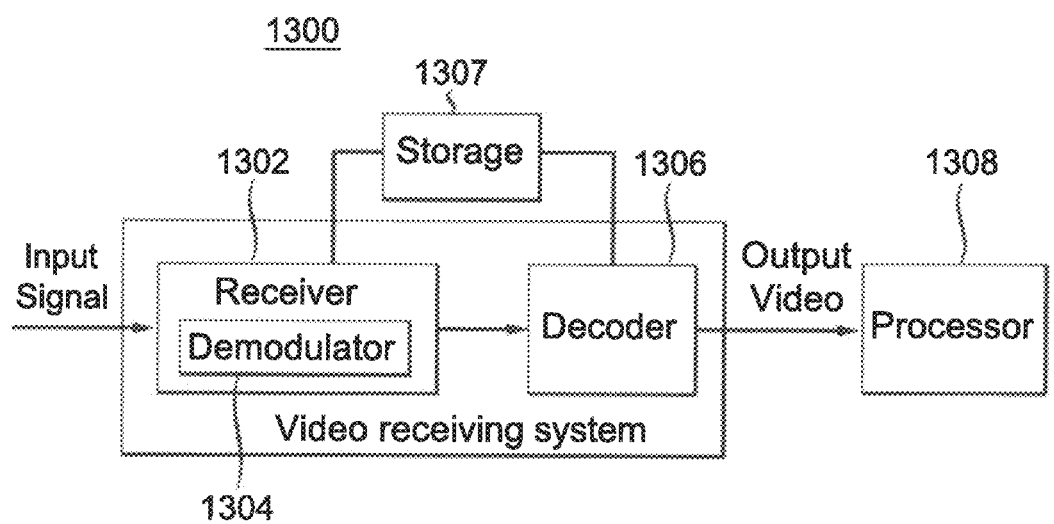
FIG. 13 is a block diagram depicting another example of an image processing system that may be used with one or more implementations.

Referring now to FIG. 13, a data receiving system or apparatus 1300 is shown to which the features and principles described above may be applied. The data receiving system or apparatus 1300 may be configured to receive signals over a variety of media, such as, for example, storage device, satellite, cable, telephone-line, or terrestrial broadcast. The signals may be received over the Internet or some other network.

The data receiving system or apparatus 1300 may be, for example, a cell-phone, a computer, a set-top box, a television, or other device that receives encoded video and provides, for example, decoded video signal for display (display to a user, for example), for processing, or for storage. Thus, the data receiving system or apparatus 1300 may provide its output to, for example, a screen of a television, a computer monitor, a computer (for storage, processing, or display), or some other storage, processing, or display device.

The data receiving system or apparatus 1300 includes a receiver 1302 for receiving an encoded signal, such as, for example, the signals described in the implementations of this application. The receiver 1302 may receive, for example, a signal output from the data transmission system 1200 of FIG. 12.

The receiver 1302 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1304, de-randomizing the energy in the signal, de-interleaving the data in the signal, and error-correction decoding the signal. The receiver 1302 may include, or interface with, an antenna (not shown). Implementations of the receiver 1302 may be limited to the demodulator 1304.

The data receiving system or apparatus 1300 includes a decoder 1306. The receiver 1302 provides a received signal to the decoder 1306. The signal provided to the decoder 1306 by the receiver 1302 may include one or more encoded bitstreams. The decoder 1306 outputs a decoded signal, such as, for example, decoded video signals including video information. The decoder 1306 may be, for example, decoder 1100 described in FIG. 11.

The data receiving system or apparatus 1300 is also communicatively coupled to a storage unit 1307. In one implementation, the storage unit 1307 is coupled to the receiver 1302, and the receiver 1302 accesses a bitstream from the storage unit 1307. In another implementation, the storage unit 1307 is coupled to the decoder 1306, and the decoder 1306 accesses a bitstream from the storage unit 1307. The bitstream accessed from the storage unit 1307 includes, in different implementations, one or more encoded bitstreams. The storage unit 1307 is, in different implementations, one or more of a standard DVD, a Blu-Ray disc, a hard drive, or some other storage device.

The output data from the decoder 1306 is provided, in one implementation, to a processor 1308. In some implementations, the decoder 1306 includes the processor 1308 and therefore performs the operations of the processor 1308. In other implementations, the processor 1308 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus and constituents included therein, for example, a processor, an encoder and a decoder, may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method comprising:
   determining a tone mapping function based on images and at least one encoding parameter;
   determining a lower dynamic range version of the images from the images based on the tone mapping function;
   encoding the lower dynamic range version of the images and information including a parameter used to encode the determined lower dynamic range version of the images, wherein the parameter is used as an input to generate an inverse tone-mapping function; and
   transmitting the encoded lower dynamic range version of the images and information in one or more signals.

2. The method of claim 1, wherein the parameter used to encode the lower dynamic range version of the images is a quantization parameter.

3. The method of claim 2, further comprising determining a Lagrangian multiplier depending on the quantization parameter.

4. The method of claim 1, wherein determining a tone mapping function comprises determining at least one of the dynamic range of the images and a probability distribution function of the images.

5. The method of claim 1, wherein determining the tone mapping function is based on a rate distortion function.

6. The method of claim 1, further comprising providing the one or more signals signal for storage.

7. The method of claim 1, further comprising interleaving the data in the one or more signals.

8. The method of claim 1, further comprising randomizing energy in the one or more signals.

9. The method of claim 1, further comprising modulating the one or more signals from one or more carriers.

10. The method of claim 1, further comprising error-correction encoding the one or more signals.

11. A method comprising:
    receiving one or more signals;
    decoding second images depicting a lower dynamic range version of first images from the one or more received signals;
    accessing information from the one or more received signals, the accessed information including a parameter used to encode the second images;
    using the parameter as an input when generating an inverse tone mapping function; and
    generating the first images from the decoded second images based on the inverse tone mapping function.

12. The method of claim 11, wherein the parameter used to encode the second image is a quantization parameter.

13. The method of claim 11, wherein the accessed information includes parameters indicative of the dynamic range of original first images corresponding to the first images to be decoded.

14. The method of claim 11, wherein the accessed information further includes parameters indicative of a probability distribution function of original first images corresponding to the first images to be decoded.

15. The method of claim 11, further comprising demodulating the one or more received signals from one or more carriers.

16. The method of claim 11, further comprising de-randomizing energy in the one or more received signals.

17. The method of claim 11, further comprising de-interleaving the data in the one or more received signals.

18. The method of claim 11, further comprising error-correction decoding the one or more received signals.

19. A data transmission apparatus comprising:
    a tone curve estimator configured to determine a tone mapping function based on images and at least one encoding parameter;
    an image generator configured to determine a lower dynamic range version of the images from the images based on the tone mapping function; and
    an encoder configured to encode the lower dynamic range version of the images and information including a parameter used to encode the determined lower dynamic range version of the images, wherein the parameter is used as an input to generate an inverse tone-mapping function; and
    a transmitter configured to transmit the encoded lower dynamic range version of the images and information in one or more signals.

20. The data transmission apparatus of claim 19, wherein the parameter used to encode the lower dynamic range version of the images is a quantization parameter.

21. The data transmission apparatus of claim 19, wherein the tone curve estimator determines a Lagrangian multiplier responsive to the quantization parameter.

22. The data transmission apparatus of claim 19, wherein the tone curve estimator determines at least one of the dynamic range of the images and a probability distribution function of the images.

23. The data transmission apparatus of claim 19, wherein the tone curve estimator determines the tone mapping function responsive to a rate distortion function.

24. The data transmission apparatus of claim 19, further comprising an interleaver configured to interleave the data in the one or more signals.

25. The data transmission apparatus of claim 19, further comprising a randomizer configured to randomize energy in the one or more signals.

26. The data transmission apparatus of claim 19, further comprising a modulator configured to modulate the one or more signals.

27. The data transmission apparatus of claim 19, further comprising an error-correction encoder configured to error-correction encoding the one or more signals.

28. The data transmission apparatus of claim 19, further comprising or interfacing with an antenna.

29. The data transmission apparatus of claim 19, wherein the data transmission apparatus is disposed in a cell phone, a computer, a set-top box, or other device that transmits encoded video and provides encoded video signals for at least one of display, processing, and storage.

30. The data transmission apparatus of claim 19, wherein the data transmission apparatus is communicatively coupled to a storage unit and configured to provide the one or more signals for storage.

31. The data transmission apparatus of claim 30, wherein the storage unit is coupled to the encoder.

32. The data transmission apparatus of claim 30, wherein the storage unit is coupled to the transmitter.

33. The data transmission apparatus of claim 30, wherein the storage unit is one or more of a standard DVD, a Blu-Ray disc, a hard drive, or other storage device.

34. The data transmission apparatus of claim 19, wherein the transmitter comprises or interfaces with an antenna.

35. A data receiving apparatus comprising:
a receiver configured to provide one or more signals;
a decoder configured to decode second images depicting a lower dynamic range version of first images from the one or more received signals;
a processor configured to:
 access information from the one or more signals, the accessed information including a parameter used to encode the second images;
 use the parameter as an input when generating an inverse tone mapping function; and
an image generator configured to generate the first images from the decoded second images based on the inverse tone mapping function.

36. The data receiving apparatus of claim 35, wherein the parameter used to encode the second image is a quantization parameter.

37. The data receiving apparatus of claim 35, wherein the accessed information includes parameters indicative of the dynamic range of original first images corresponding to the first images to be decoded.

38. The data receiving apparatus of claim 35, wherein the accessed information further includes parameters indicative of a probability distribution function of original first images corresponding to the first images to be decoded.

39. The data receiving apparatus of claim 35, further comprising a demodulator configured to demodulate the one or more received signals from one or more carriers.

40. The data receiving apparatus of claim 35, further comprising a randomizer configured to de-randomize energy in the one or more received signals.

41. The data receiving apparatus of claim 35, further comprising a de-interleaver configured to de-interleave the data in the one or more received signals.

42. The data receiving apparatus of claim 35, further comprising an error-correction decoder configured to error-correction decode the one or more received signals.

43. The data receiving apparatus of claim 35, further comprising or interfacing with an antenna.

44. The data receiving apparatus of claim 35, wherein the data receiving apparatus is disposed in a cell phone, a computer, a set-top box, a television, or other device that receives encoded video and provides decoded video signals for at least one of display, processing, and storage.

45. The data receiving apparatus of claim 35, wherein the data receiving apparatus further comprises or interfaces with a display.

46. The data receiving apparatus of claim 45, wherein the display comprises one or more of a screen of a television, a computer monitor, a computer, and a display device.

47. The data receiving apparatus of claim 35, wherein the data receiving apparatus is communicatively coupled to a storage unit and configured to access the one or more signals from the storage unit.

48. The data receiving apparatus of claim 47, wherein the storage unit is coupled to the decoder.

49. The data transmission apparatus of claim 47, wherein the storage unit is coupled to the receiver.

50. A non-transitory computer-readable storage medium having stored instructions that, when executed by a processor, cause the processor to perform:
determining a tone mapping function based on images and at least one encoding parameter;
determining a lower dynamic range version of the images from the images based on the tone mapping function;
encoding the lower dynamic range version of the images and information including a parameter used to encode the determined lower dynamic range version of the images, wherein the parameter is used as an input to generate an inverse tone-mapping function; and
transmitting the encoded lower dynamic range version of the images and information in one or more signals.

51. A non-transitory computer-readable storage medium having stored instructions that, when executed by a processor, cause the processor to perform:
receiving one or more signals;
decoding second images depicting a lower dynamic range version of first images from the one or more received signals;
accessing information from the one or more received signals, the accessed information including a parameter used to encode the second images;
using the parameter as an input when generating an inverse tone mapping function; and
generating the first images from the decoded second images based on the inverse tone mapping function.

* * * * *